F. H. SMITH.
NUT AND WASHER.
APPLICATION FILED SEPT. 13, 1920.
1,406,423. Patented Feb. 14, 1922.
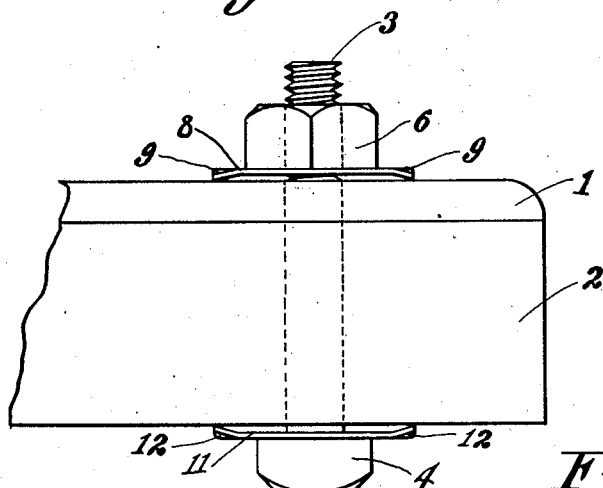
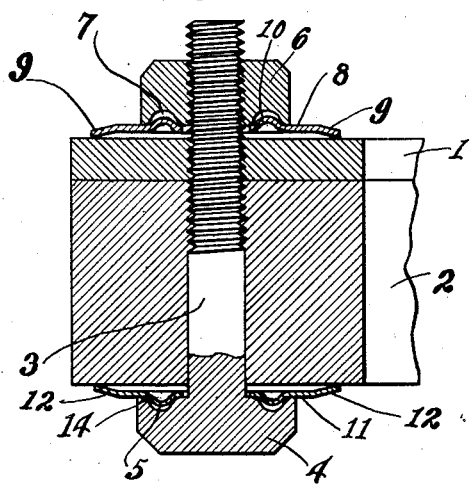
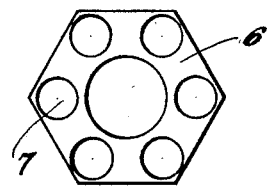
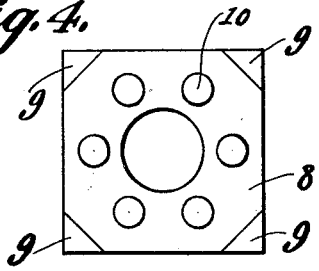
F. H. Smith, Inventor

UNITED STATES PATENT OFFICE.

FRANK H. SMITH, OF GREENWOOD, MISSISSIPPI.

NUT AND WASHER.

1,406,423.

Specification of Letters Patent.   Patented Feb. 14, 1922.

Application filed September 13, 1920. Serial No. 409,880.

*To all whom it may concern:*

Be it known that I, FRANK H. SMITH, a citizen of the United States, residing at Greenwood, in the county of Leflore and State of Mississippi, have invented a new and useful Nut and Washer, of which the following is a specification.

It is the object of this invention to provide simple means whereby a bolt or a nut may be prevented from turning, this result being accomplished by the use of a novel form of holding plate, the plate and the head of the bolt, or the plate and the nut being provided with interengaging parts.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in elevation, two pieces of material held together by a nut and bolt embodying the device forming the subject matter of this application; Figure 2 is a sectional view wherein parts appear in elevation; Figure 3 is a plan showing the nut; Figure 4 is a plan showing one holding plate; Figure 5 is an elevation wherein the plate disclosed in Figure 4 is viewed edgewise; and Figure 6 is an end view of the bolt, showing the head thereof.

The numerals 1 and 2 denote two pieces of material held together by a bolt 3 having a head 4 provided with approximately circular seats 5. A nut 6 is threaded on the bolt 3 and is provided with seats 7. A spring plate 8 surrounds the bolt 3 and is located between the nut 6 and the piece 1 of material. The plate 8 is of angular outline and is bent at its corners to form holding prongs 9 engaging the piece 1 of material, the plate having approximately circular bosses 10, the bosses 10 being formed by distorting the plate, the bosses being adapted to cooperate with the seats 7. The bolt 3 is surrounded by a plate 11 and at its corners is formed prongs 12 cooperating with the piece 2 of material, the plate 11 being distorted to form bosses 14 cooperating with the seats 5 of the bolt head 4.

When the nut 6 is rotated, the bosses 10 cooperate with the seats 7 and act like pawls. The plate 8 cannot turn readily, because the prongs 9 bear on the piece 1 of material. In a similar way, the bolt 3 is prevented from rotating, owing to the cooperation between the plate 11 and the piece 2 of material. If, as is common, the shank of the bolt happens to be square adjacent to the head 4, then the plate 11 may be omitted, since the bolt will not rotate in the absence of the plate 11. In Figure 2 of the drawings, the nut is shown but partially seated. When the nut is rotated to a firm seat, the plates 11 and 8 will be pressed against the pieces 2 and 1 of material and all parts of the structure will be locked or held against relative movement.

Having thus described the invention, what is claimed is:—

In a device of the class described, a bolt, and cooperating elements comprising a head on the bolt and a nut on the bolt, one of said cooperating elements being rotatable and having approximately circular hemi-spherical seats on its inner surface; and a spring plate on the bolt, the plate being angular in outline and having corners which are bent to form holding prongs, the plate being distorted to form approximately circular hemispherical bosses coacting with the seats, to prevent rotation in the absence of a force sufficient to disengage the bosses from the seats, the form of the bosses facilitating rotation, upon the application of sufficient force.

In testimony that I claim the foregoing as my own, I have hereto affixed my signature in the presence of two witnesses.

FRANK H. SMITH.

Witnesses:
PHIL S. JONES,
H. C. A. COUNGER.